(12) United States Patent
Arroyo et al.

(10) Patent No.: US 9,081,764 B2
(45) Date of Patent: Jul. 14, 2015

(54) IIMPLEMENTING DMA MIGRATION OF LARGE SYSTEM MEMORY AREAS

(75) Inventors: Jesse P. Arroyo, Rochester, MN (US);
Ellen M. Bauman, Rochester, MN (US);
Timothy R. Block, Rochester, MN (US);
Leonardo Letourneaut, Rochester, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 13/164,972

(22) Filed: Jun. 21, 2011

(65) Prior Publication Data

US 2012/0331260 A1     Dec. 27, 2012

(51) Int. Cl.
*G06F 13/28*     (2006.01)
*G06F 9/455*     (2006.01)
*G06F 12/10*     (2006.01)

(52) U.S. Cl.
CPC ............ *G06F 13/28* (2013.01); *G06F 9/45558* (2013.01); *G06F 12/1081* (2013.01)

(58) Field of Classification Search
CPC ................ G06F 13/28; G06F 9/45558; G06F 2009/4557; G06F 3/0647; G06F 12/1081
See application file for complete search history.

(56) References Cited

U.S. PATENT DOCUMENTS

| 7,281,104 B1 | 10/2007 | Tsypliaev et al. | |
|---|---|---|---|
| 2007/0260839 A1* | 11/2007 | Arndt | 711/165 |
| 2010/0257328 A1 | 10/2010 | Liu | |
| 2010/0287345 A1* | 11/2010 | Cherian et al. | 711/162 |
| 2011/0302577 A1* | 12/2011 | Reuther et al. | 718/1 |
| 2012/0254582 A1* | 10/2012 | Raj et al. | 711/206 |

* cited by examiner

Primary Examiner — Charles Rones
Assistant Examiner — Ralph A Verderamo, III
(74) Attorney, Agent, or Firm — Joan Pennington

(57) ABSTRACT

A method, system and computer program product are provided for implementing memory migration of large system memory pages in a computer system. A large page to be migrated from a current location to a target location is converted into a plurality of smaller subpages for a processor or system page table. The migrated page is divided into first, second and third segments, each segment composed of the smaller subpages and each respective segment changes as each individual subpage is migrated. CPU and I/O accesses to respective subpages of the first segment are directed to corresponding subpages of the target page or new page. I/O accesses to respective subpages of the second segment use a dual write mode targeting corresponding subpages of both the current page and the target page. CPU and I/O accesses to the subpages of the third segment access the corresponding subpages of the current page.

18 Claims, 5 Drawing Sheets

| LARGE PAGE (16MB OR LARGER) 302 | CPU AND I/O DEVICE ACTION 304 | SEGMENT 306 |
|---|---|---|
| 64K | CPU & I/O READ FROM TARGET SUBPAGE. CPU & I/O WRITE TO TARGET SUBPAGE. | FIRST SEGMENT (SUBPAGES ALREADY MIGRATED) |
| * * * | * * * | |
| 64K | CPU & I/O READ FROM TARGET SUBPAGE. CPU & I/O WRITE TO TARGET SUBPAGE. | |
| 64K | I/O READ FROM CURRENT PAGE. I/O DUAL WRITE TO BOTH CURRENT AND TARGET SUBPAGES. | SECOND SEGMENT (SUBPAGES CURRENTLY BEING MIGRATED) |
| 64K | CPU & I/O READ FROM CURRENT SUBPAGE CPU & I/O WRITE TO CURRENT SUBPAGE. | THIRD SEGMENT (SUBPAGES TO BE MIGRATED) |
| * * * | * * * | |
| 64K | CPU & I/O READ FROM CURRENT SUBPAGE CPU & I/O WRITE TO CURRENT SUBPAGE. | |

| 400 BASE INVENTION (4 GB PAGE) ||
| --- | --- |
| I/O PAGE TABLE 402 | CPU PAGE TABLE 404 |
| 4 GB PTE | 64K PTE 1 |
| | 64K PTE 2 |
| | 64K PTE 3 |
| | * * * |
| | 64K PTE 65,536 |

| 450 OPTIMIZED INVENTION (4 GB PAGE) ||
| --- | --- |
| I/O PAGE TABLE 452 | CPU PAGE TABLE 454 |
| 4 GB PTE | 256 MB PTE 1 |
| | 256 MB PTE 2 |
| | 256 MB PTE 3 |
| | 16 MB PTE 1 |
| | 16 MB PTE 2 |
| | 16 MB PTE 3 |
| | 1 MB PTE 1 |
| | 1 MB PTE 2 |
| | 64K PTE 1 |
| | 64K PTE 2 |
| | * * * |
| | 64K PTE 15 |
| | 64K PTE 16 |
| | * * * |
| | 1 MB PTE 4 |
| | * * * |
| | 1 MB PTE 15 |
| | 16 MB PTE 4 |
| | 16 MB PTE 5 |
| | * * * |
| | 16 MB PTE 15 |
| | 256 MB PTE 5 |
| | 256 MB PTE 6 |
| | * * * |
| | 256 MB PTE 14 |
| | 256 MB PTE 15 |

FIG. 4

IIMPLEMENTING DMA MIGRATION OF LARGE SYSTEM MEMORY AREAS

FIELD OF THE INVENTION

The present invention relates generally to the data processing field, and more particularly, relates to a method, system and computer program product for implementing direct memory access (DMA) migration of large system memory areas or pages with dual write capability in a computer system.

DESCRIPTION OF THE RELATED ART

Memory migration is the moving of memory contents from one physical memory location to another physical memory location. Memory migration is done for many reasons including freeing system memory space so it can be given to another logical partition, preparing for a concurrent maintenance operation on the physical memory itself, rearranging pages to allow for larger physical memory areas, and normal operating system (OS) bookkeeping operations.

Memory migration is readily accomplished if the memory is only accessed via the central processor unit (CPU) through normal virtual memory techniques. However, solutions are more difficult if the memory is also capable of being accessed directly via (I/O) devices. In that case, something needs to be done such that no updates to the memory by the I/O device are lost while the contents of the memory are moved from an original page location to the new page location.

There are two common prior solutions for memory migration. The first solution is to suspend the I/O device during the migration process. This method has many drawbacks. The hardware (HW) is idle during the migration process, decreasing performance. HW transactions may be missed, leading to unnecessary error recovery; for example, retries or other network recovery may be required on an external fabric. These drawbacks grow worse as the size of the page being migrated increases. Additionally, the act of suspending an entire I/O chip and then successfully resuming has proven to be difficult to implement in HW as modern I/O chips have many operations proceeding in parallel.

A second prior solution is to implement what is known as dual write capability. The HW is not suspended with this solution. Instead, during the migration process the I/O device writes both the current page and to the target page, with reads targeting the current page. Once the data has been copied to the target page, so that the pages are identical, reads and writes are both directed to the target page. This has the advantage of not requiring the HW to be suspended and reduces impacts on external networks. This solution works well for small page sizes.

Both types of prior solutions are limited to smaller pages, for example, 4K pages in some products, or possibly 64K pages in some newer products. Large I/O page sizes, such as 1M, 16M, 256M, 4G or larger page sizes, are still not capable of being migrated. The time required to copy the data from the current page to the target page becomes prohibitively large for such large page sizes.

Typically the memory copy is typically done in a hypervisor in a computer system, and an operation of that duration in the hypervisor can cause system disturbances. The CPU or user applications typically need to be prevented from accessing the page being migrated for a long duration of time, which could cause application disruptions.

Disadvantages of lacking capability to migrate large memory pages are significant. For example, logical partitions are unable to rearrange memory for optimum usage. This may prevent the creation of large enough physically contiguous regions to create large pages, for example 16 MB or larger pages, providing a negative performance impact. Lacking capability to move memory between logical partitions may result in sub-optimal performance, and the inability to free enough memory to allow the creation of additional partitions. Lacking capability to free memory also limits concurrently repairing memory components. Partitions may be forced to use smaller pages or pages capable of being migrated to alleviate drawbacks from lacking capability to free memory and to move memory between logical partitions. This also results in a system with lower CPU and I/O performance.

A need exists for an effective mechanism for implementing direct memory access (DMA) migration of large system memory pages with dual write capability in a computer system.

SUMMARY OF THE INVENTION

Principal aspects of the present invention are to provide a method, system and computer program product for implementing direct memory access (DMA) migration of large system memory areas with dual write capability in a computer system. Other important aspects of the present invention are to provide such method, system and computer program product substantially without negative effects and that overcome many of the disadvantages of prior art arrangements.

In brief, a method, system and computer program product are provided for implementing direct memory access (DMA) migration of large system memory pages with dual write capability in a computer system. A large page to be migrated from a current page location to a target page location is converted into a plurality of smaller subpages for a processor or system page table. For the duration of the migration process, the processor is allowed to continue to access the large system memory page during the migration process. The page being migrated is divided into a plurality of segments, each segment composed of the smaller subpages, and the plurality of segments is maintained during the migration process, each respective segment changes as each respective individual subpage is migrated. CPU and I/O accesses to the large system memory page during memory migration are directed based upon a respective segment for the respective subpages.

In accordance with features of the invention, the CPU and I/O accesses to respective subpages of a first segment are directed to corresponding subpages of the target page or new page. I/O accesses to respective subpages of a second segment use a dual write mode targeting corresponding subpages of both the current page and the target page. CPU and I/O accesses to the subpages of a third segment are directed to the corresponding subpages of the current page.

In accordance with features of the invention, the method enables all system memory to be migrated, where a page of any size can now be migrated.

In accordance with features of the invention, because dual write access occurs only within a small segment of the large system memory page being migrated, I/O bus and memory bus efficiency are improved over conventional arrangements.

In accordance with features of the invention, a hardware (HW) device receives the page size to be migrated, such as 4K, 64K, 1 MB, 16 MB, 256 MB, 4 GB, and the like. The HW device receives the subpage size to be used for the migration, such as, 64 KB. The HW device includes dual write support enhancements to access to respective subpages of the first segment going to corresponding subpages of the target page or new page; to access respective subpages of the second segment using dual write mode targeting corresponding subpages of both the current page and the target page; and to access subpages of the third segment going to the corresponding subpages of the current page.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is a diagram illustrating example first, second and third segments, each composed of the smaller subpages together with respective CPU and I/O device actions for implementing direct memory access (DMA) migration of a large system memory page in accordance with the preferred embodiment;

FIG. 4 is a diagram illustrating example I/O and CPU page tables for implementing direct memory access (DMA) migration of a large system memory page in accordance with the preferred embodiments.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing direct memory access (DMA) migration of large system memory pages with dual write capability in a computer system.

In accordance with features of the invention, the method, system and computer program product are fully interoperable with prior dual write and suspend solutions. That is, a large system page, for example, 16 MB optionally includes portions mapped as 4K pages for devices implementing prior solutions, where that large system page is being migrated.

Figure 1:
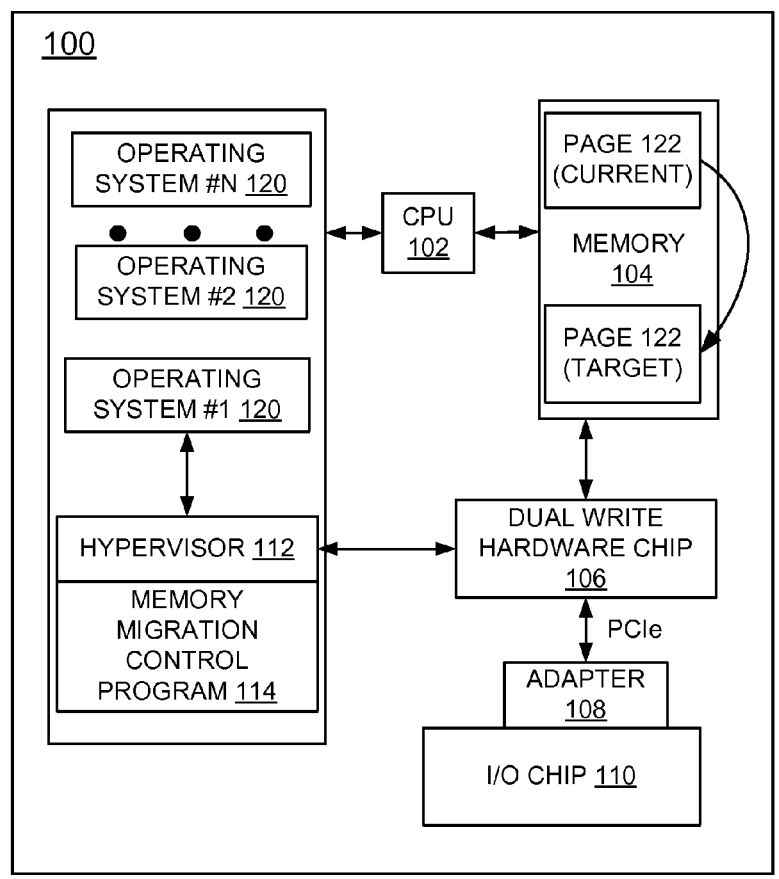
FIG. 1 is a block diagram representation illustrating an example system for implementing direct memory access (DMA) migration of a large system memory page in accordance with the preferred embodiment.

Having reference now to the drawings, in FIG. 1, there is shown an example computer system generally designated by the reference character 100 for implementing direct memory access (DMA) migration of a large system memory page in accordance with the preferred embodiment. Computer system 100 includes a central processor unit (CPU) 102 coupled to a system memory 104, such as a dynamic random access memory (DRAM) proximate to the CPU 102. Computer system 100 includes a dual write hardware chip 106 coupled to the system memory 104 and coupled to an adapter 108 and an Input/Output (I/O) chip 110 via a high speed system interconnect, such as, Peripheral Component Interconnect Express (PCIe) interconnect. Computer system 100 includes a hypervisor 112 and a memory migration control program 114 of the preferred embodiment, and a plurality of operating systems 120, #1-N. Computer system 100 implements memory migration of a large system memory page 122 from a current location to a target location within the system memory 104 in accordance with the preferred embodiment.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

In accordance with features of the invention, a large memory page 122 to be migrated from a current location to a target location is converted into a plurality of smaller subpages for a processor or CPU page table. The subpage is sized to fit the optimum page size for a current hardware dual-write chip 106. For the duration of the migration process, the processor is allowed to continue to access the memory page 122 during the migration process. The migrated page is divided into first, second and third segments, each segment composed of the smaller subpages, such as illustrated and described with respect to FIG. 3. The breakdown of which subpages are in each respective segment changes as each respective individual subpage is migrated.

In accordance with features of the invention, CPU and I/O accesses to respective subpages of the first segment go to corresponding subpages of the target page or new page. CPU and I/O accesses to respective subpages of the second segment use a dual write mode targeting corresponding subpages of both the current page and the target page. CPU and I/O accesses to the subpages of the third segment access the corresponding subpages of the current page.

In accordance with features of the invention, the dual-write hardware chip 106 receives the page size to be migrated, such as 4K, 64K, 1 MB, 16 MB, 256 MB, 4 GB, and the like. The dual-write hardware chip 106 receives the subpage size to be used for the migration, such as, 64KB. The dual-write hardware chip 106 includes dual write support enhancements with the dual write hardware chip 106 configured to access to respective subpages of the first segment going to corresponding subpages of the target page or new page; to access respective subpages of the second segment using dual write mode targeting corresponding subpages of both the current page and the target page; and to access subpages of the third segment going to the corresponding subpages of the current page.

Figure 2:
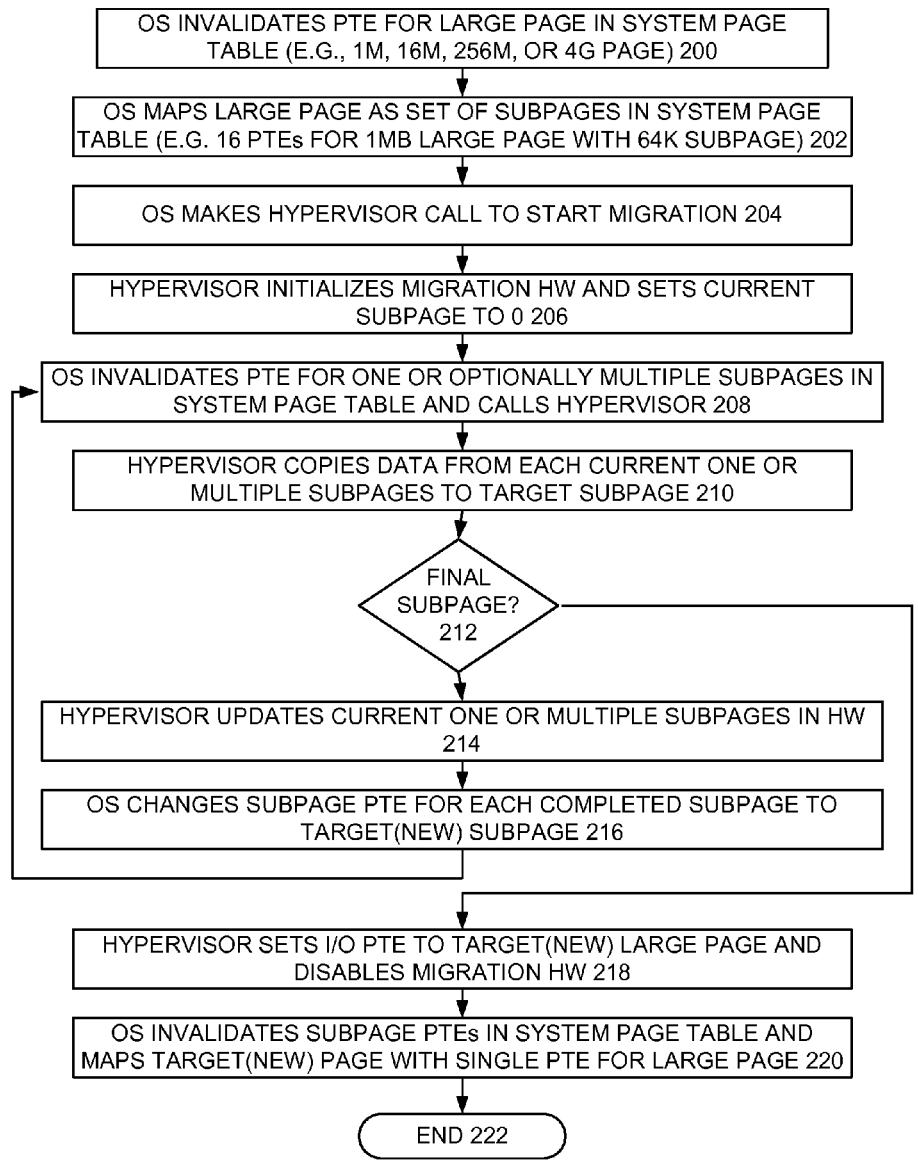
FIG. 2 is a flow chart illustrating exemplary operations for implementing enhanced memory migration of a large system memory page in accordance with the preferred embodiment.

Referring to FIG. 2, there are shown exemplary operations for implementing enhanced migration of large system memory pages in accordance with the preferred embodiment. As indicated at a block 200, the operating system (OS), such as OS #1, 120, a page table entry (PTE) for a large page 122 in the system page table, such as for a 1 MB, 16 MB, 256 MB or 4 GB page 122. The OS maps the large page as a set of subpages in the system page table, for example, 16 PTEs for 1 MB page with such as, 64 KB subpage size as indicated at a block 202. The OS makes a hypervisor call to start memory migration as indicated at a block 204. The hypervisor, such as hypervisor 112, initializes migration hardware (HW), such as dual write hardware chip 106, and sets the current subpage to zero as indicated at a block 206.

As indicated at a block 208, the OS invalidates PTE for either one subpage or multiple subpages in the system page table and calls the hypervisor.

In accordance with features of the invention, optionally operations are performed on multiple subpages during a single call to the hypervisor. The number of subpages which can be migrated during a single call to the hypervisor depends upon the length of time to migrate a single subpage. Migrating multiple subpages during a single call to the hypervisor reduces the overall overhead to do the migration, for example, requiring fewer hypervisor calls, context switches, system page table updates, and the like.

The hypervisor copies data from each current one or optionally multiple subpages to the target subpage as indicated at a block 210. Checking for a final subpage is performed as indicated at a decision block 212.

As indicated at a block 214 if the final subpage is not identified, then the hypervisor updates the current one or optionally multiple subpages in HW. The OS changes the subpage PTE for each completed subpage to the target or new subpage in the system or CPU page table as indicated at a block 216. Then the operations return to block 208 and OS invalidates PTE for the next one subpage, or multiple subpages in the system page table and calls the hypervisor and continues as shown.

Otherwise if the final subpage is identified, then the hypervisor sets the I/O PTE to the target or new large page 122 and disables migration HW as indicated at a block 218. The OS invalidates the subpage PTEs in the system page table, and maps the target page with a single PTE for the large page 122 as indicated at a block 220. Then the operations end as indicated at a block 222.

Referring to FIG. 3, there are shown example large page 302, such as 16 MB or larger, together with a respective CPU and I/O device action 304 and a respective segment 306 including first, second and third segments, each composed of the smaller subpages for implementing direct memory access (DMA) migration of a large system memory page in accordance with the preferred embodiment.

As shown, a first segment 306 includes subpages already migrated. For each of the subpages in the first segment 306, the CPU and I/O read from the target subpage and the CPU and I/O write to the target subpage.

A second segment 306 includes subpages currently being migrated. For each of the subpages in the second segment 306, optionally the CPU and I/O read from the current subpage and optionally the CPU and the I/O dual write to the both the current and target subpages or the I/O dual write to the both the current and target subpages. The CPU optionally is arranged without dual write capability in the second segment 306. For example, the host OS invalidating the current subpage PTE at block 208 in FIG. 2 prevents the CPU form accessing the subpage during the migration, so a dual write CPU is not necessary.

A third segment 306 includes subpages yet to be migrated. For each of the subpages in the third segment 306, the CPU and I/O read from the current subpage and the CPU and I/O write to the current subpage.

In accordance with features of the invention, increased address translation efficiency is provided for both I/O operations and CPU/memory operations, for example, translation lookaside buffer (TLB) cache effectiveness increases, and the like. This increases overall system performance. Second, large pages allow for less system memory to be used as overhead for managing the address translation tables because there are fewer large pages in a given memory size than standard pages. This leaves more memory available for application usage, again improving overall system performance.

Referring to FIG. 4, there are shown example base invention generally designated by reference character 400 and an optimized invention designated by reference character 450 for implementing direct memory access (DMA) migration of a large system memory page in accordance with the preferred embodiment.

The base invention 400 for memory migration includes an I/O page table 402 and a CPU page table 404. The optimized invention 450 for memory migration includes an I/O page table 452 and a CPU page table 454, for example, with a current migration point at 818 MB into 4 GB page 122. Each I/O page table 402, 452 contains only a single page table entry (PTE) for the large page being migrated, such as the illustrated 4 GB PTE. The memory migration of the invention includes CPU page table 404 includes a plurality of PTEs or registers that act as a modifier on that 4 GB PTE.

As shown, the CPU page table 404 includes a plurality of PTEs, each 64K PTEs # 1-65,536. As shown, the CPU page table 454 of the optimized invention 450 includes plurality of PTEs that act as a modifier on that 4 GB PTE of the I/O page table 452 that is updated during the memory migration so it does not contain only the 64K subpage-sized page table entries (PTEs). Instead CPU page table 454 contains a mix of subpage sized PTEs and larger PTEs to map the original 4 GB page. The base invention 400 requires 64K PTEs to map a 4 GB huge page into 64K subpages for the duration of the migration. The optimized invention 450 requires, for example, only about 64 PTEs for the duration of the migration. This is a substantial savings in memory requirements and increases the effectiveness of the TLB during the migration process.

Figure 5:
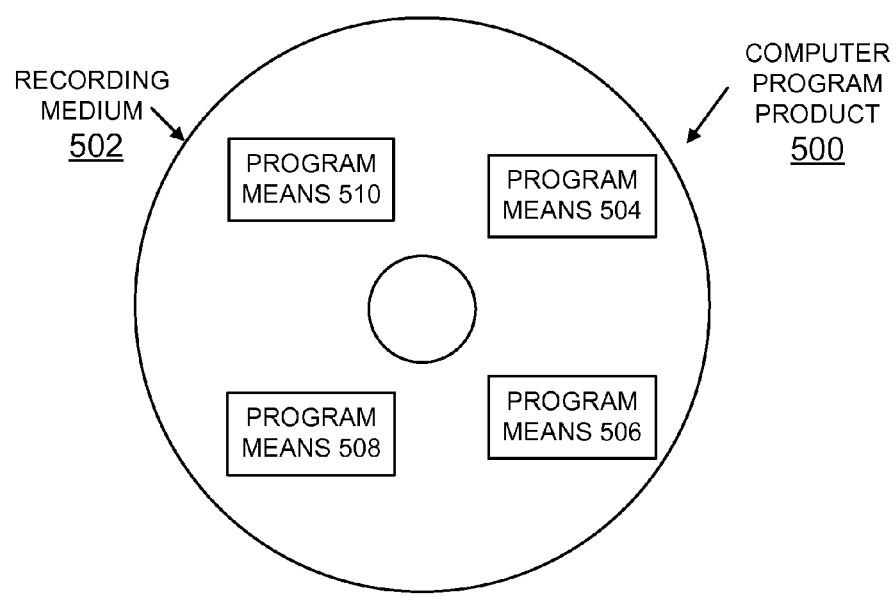
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. Recording medium 502 stores program means 504, 506, 508, and 510 on the medium 502 for carrying out the methods for implementing migration of a large system memory page of the preferred embodiment in the system 100 of FIG. 1.

A sequence of program instructions or a logical assembly of one or more interrelated modules defined by the recorded program means 504, 506, 508, and 510, direct the computer system 100 for implementing memory migration of a large system memory page of the preferred embodiment.

While the present invention has been described with reference to the details of the embodiments of the invention shown in the drawing, these details are not intended to limit the scope of the invention as claimed in the appended claims.

What is claimed is:

1. A method for implementing memory migration of large system memory pages in a computer system comprising:

converting a memory page to be migrated from a current page location to a target page location into a plurality of smaller subpages by converting the memory page to be migrated into the plurality of smaller subpages having a predefined size optimized for a dual write hardware chip;

allowing a central processor unit (CPU) and an Input/Output (I/O) device to continue to access the memory page during the memory migration process;

dividing the memory page into a plurality of segments, each segment composed of the smaller subpages;

maintaining the plurality of segments during the memory migration process, each respective segment changing responsive to each respective individual subpage being migrated; and directing CPU and I/O accesses to the memory page during memory migration based upon a respective segment for the respective subpages.

2. The method as recited in claim 1 wherein directing CPU and I/O accesses to the memory page during memory migration based upon a respective segment for the respective subpages includes directing CPU and I/O accesses to respective subpages of a first segment to corresponding subpages of the target page.

3. The method as recited in claim 1 wherein directing CPU and I/O accesses to the memory page during memory migration based upon a respective segment for the respective subpages includes directing I/O accesses to respective subpages of a second segment using a dual write mode and targeting corresponding subpages of both the current page and the target page.

4. The method as recited in claim 1 wherein directing CPU and I/O accesses to the memory page during memory migration based upon a respective segment for the respective subpages includes directing CPU and I/O accesses to respective subpages of a third segment to the corresponding subpages of the current page.

5. The method as recited in claim 1 wherein converting a memory page to be migrated from a current page location to a target page location into a plurality of smaller subpages includes converting the large memory page to be migrated into a set of smaller pages for a processor page table.

6. The method as recited in claim 1 wherein maintaining the plurality of segments during the memory migration process includes performing operations on multiple subpages during a single call to a hypervisor.

7. The method as recited in claim 1 wherein maintaining the plurality of segments during the memory migration process includes changing a subpage page table entry for each completed subpage to the target subpage.

8. The method as recited in claim 1 wherein converting a memory page to be migrated from a current page location to a target page location into a plurality of smaller subpages includes updating a processor page table during the memory migration process with a selected page table entry having a selected larger subpage size based upon a respective segment for the selected page table entry.

9. A system for implementing memory migration of large system memory pages in a computer system comprising:

a system memory including a memory page to be migrated from a current page location to a target page location;

a central processor unit (CPU) coupled to said system memory;

an Input/Output (I/O) device coupled to said system memory;

a dual write hardware chip;

a memory migration control computer program product tangibly embodied on a non-transitory computer readable storage medium, said memory migration control computer program product converting a memory page to be migrated from a current page location to a target page location into a plurality of smaller subpages by converting the memory page to be migrated into the plurality of smaller subpages having a predefined size optimized for said dual write hardware chip; allowing said CPU and said I/O device to continue to access the memory page during the memory migration process; dividing the memory page into a plurality of segments, each segment composed of the smaller subpages; maintaining the plurality of segments during the memory migration process, each respective segment changing responsive to each respective individual subpage being migrated; and directing CPU and I/O accesses to the memory page during memory migration based upon a respective segment for the respective subpages.

10. The system as recited in claim 9 wherein said memory migration control computer program product directing CPU and I/O accesses to the memory page during memory migration based upon a respective segment for the respective subpages includes said memory migration control computer program product directing CPU and I/O accesses to respective subpages of a first segment to corresponding subpages of the target page.

11. The system as recited in claim 9 wherein said memory migration control computer program product directing I/O accesses to the memory page during memory migration based upon a respective segment for the respective subpages includes said memory migration control computer program product directing CPU and I/O accesses to respective subpages of a second segment using a dual write mode and targeting corresponding subpages of both the current page and the target page.

12. The system as recited in claim 9 wherein said memory migration control computer program product directing CPU and I/O accesses to the memory page during memory migration based upon a respective segment for the respective subpages includes said memory migration control computer program product directing CPU and I/O accesses to respective subpages of a third segment to the corresponding subpages of the current page.

13. A computer program product for implementing memory migration of large system memory pages in a computer system, said computer program product comprising a non-transitory machine readable medium including instructions embodied thereon, said instructions, when executed by the computer system, cause the computer system to perform the steps comprising:

converting a memory page to be migrated from a current page location to a target page location into a plurality of smaller subpages by converting the memory page to be migrated into the plurality of smaller subpages having a predefined size optimized for a dual write, hardware chip;

allowing a central processor unit (CPU) and an Input/Output (I/O) device to continue to access the memory page during the memory migration process;

dividing the memory page into a plurality of segments, each segment composed of the smaller subpages;

maintaining the plurality of segments during the memory migration process, each respective segment changing responsive to each respective individual subpage being migrated; and directing CPU and I/O accesses to the memory page during memory migration based upon a respective segment for the respective subpages.

14. The computer program product as recited in claim 13 wherein directing CPU and I/O accesses to the memory page during memory migration based upon a respective segment for the respective subpages includes directing CPU and I/O accesses to respective subpages of a first segment to corresponding subpages of the target page.

15. The computer program product as recited in claim 13 wherein directing CPU and I/O accesses to the memory page during memory migration based upon a respective segment for the respective subpages includes directing CPU and I/O accesses to respective subpages of a second segment using a dual write mode and targeting corresponding subpages of both the current page and the target page.

16. The computer program product as recited in claim 13 wherein directing CPU and I/O accesses to the memory page during memory migration based upon a respective segment for the respective subpages includes directing CPU and I/O accesses to respective subpages of a third segment to the corresponding subpages of the current page.

17. The computer program product as recited in claim 13 wherein maintaining the plurality of segments during the memory migration process includes performing operations on multiple subpages during a single call to a hypervisor.

18. The computer program product as recited in claim 13 wherein converting a memory page to be migrated from a current page location to a target page location into a plurality of smaller subpages includes updating a processor page table during the memory migration process with a selected page table entry having a selected larger subpage size based upon a respective segment for the selected page table entry.

* * * * *